United States Patent Office 3,469,090
Patented Sept. 23, 1969

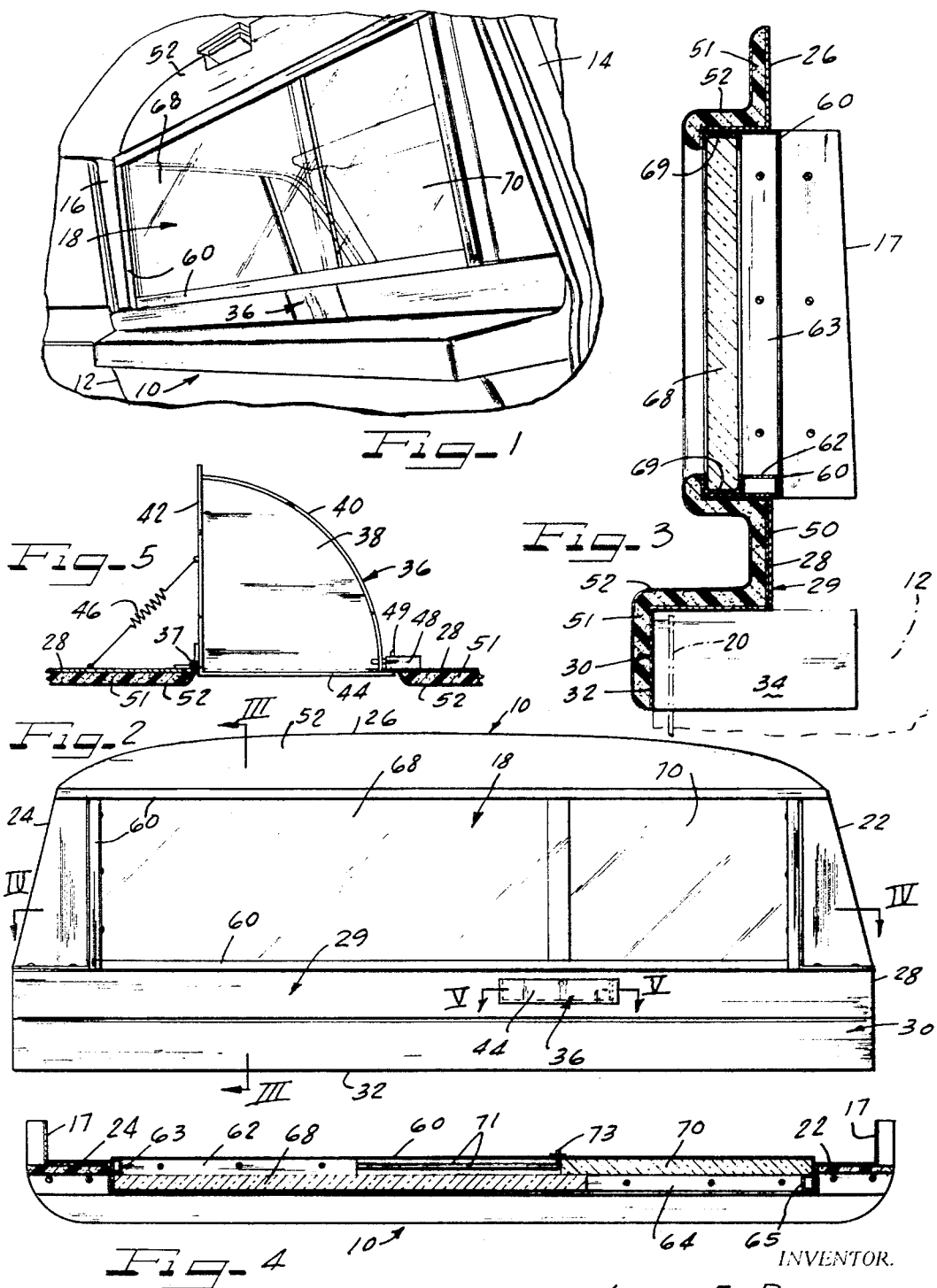

3,469,090
PARTITION FOR VEHICLE BODIES
James E. Redus, 7950 S. Ingleside Ave.,
Chicago, Ill. 60619
Filed June 1, 1967, Ser. No. 642,874
Int. Cl. B62d 33/04; E06b 7/32
U.S. Cl. 296—24                               8 Claims

ABSTRACT OF THE DISCLOSURE

A bulletproof partition for separating the driving and passenger compartments of a taxicab having a frame adapted to nest over the front seat, a bulletproof window supported by the frame, a tray for the exchange of money, and a vent to allow communication between the compartments.

Background of the invention

It is known to use a partition as a protection device in banking practices or the like. Similarly, it is known to use partitions in vehicles for purposes of privacy.

The growth in the number of crimes committed against taxicab drivers by passengers has created a need for a protection device for the driver. Such crimes include the felonies of robbery and murder. The taxicab driver is particularly vulnerable in that many local laws require the driver to go where commanded by the passenger. This permits the passenger to direct the driver to locations where privacy prevents any intrusion during the commission of a crime by the passenger against the taxicab driver.

Many suggestions have been made for protection of the taxicab driver including installation of two-way radios in the taxicabs, arming the taxicab drivers with hand weapons and signaling systems for indicating that a crime is being committed. All of these suggestions have the deficiencies of requiring a positive action on the part of the taxicab driver.

As the driver must direct his primary attention to the road, it is seen that a passive protection means is needed for the taxicab driver.

Summary

According to the principles of the present invention, a bullet proof partition is provided for separating the driver and passenger compartments which are generally partially divided by a front seat of a vehicle such as a taxicab, and in which the partition comprises frame means supporting a bullet proof window, the frame means having a money transfer opening therein for exchanges between the driver and a passenger, a horizontally movable tray hingedly mounted at one side of the opening to be swung between a position in the driver compartment and a position within the passenger compartment and having means for closing the opening when in either of said compartments, and releasable lock means operative to hold the tray in one or both of said positions.

Accordingly, it is an object of the present invention to provide a bullet proof partition for protection of a driver.

Another object of the present invention is to provide a bullet proof partition of such construction as to be adjustable to fit a plurality of vehicles.

A further object of this invention is to provide a bullet proof partition which provides positive protection for the driver against the commission of a violent crime.

Yet another object of this invention is to provide a bullet proof partition for a taxicab which does not interfere with the commercial activities of the vehicle.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:

FIG. 1 is an elevation view of a bullet proof partition according to the invention;

FIG. 2 is a front plan view of the partition from the passengers compartment;

FIG. 3 is a reduced partial sectional view taken along line III—III of FIG. 2;

FIG. 4 is a sectional view taken along the line IV—IV of FIG. 2; and

FIG. 5 is an enlarged partial sectional view taken along the line V—V of FIG. 1.

As shown on the drawings:

The principles of this invention are particularly useful when embodied in a bullet proof partition as illustrated in FIG. 1, generally indicated by the numeral 10. The bullet proof partition 10 is nested over the front seat 12 of a vehicle and bolted to the right and left door frames 14, 16, respectively, through member 17. The partition 10 has a window 18.

The partition 10 includes a right and left panel 22, 24, respectively, a top panel 26, and a bottom panel 28 which are bolted together. The bottom panel 28 rests on a nesting member 30 composed of a long panel section 32 and a pair of short panel sections 34.

In a money transfer aperture formed in the bottom panel 28, there is a hinged tray 36 having a hinge 37, a bottom of quarter round 38 with an outer radial wall 40 and two side walls 42 and 44. The wall 42 has an increased length and width to abut the bottom panel 28 in the open position and provides line of sight protection to the driver from any object which might be passed through the aperture. Attached to the wall 42 is a spring 46 which biases the tray 36 in the closed position in the driver's compartment. A lock 48 is provided for the tray 36. The lock 48 has a sliding bolt 49 to lock the tray in the closed position and hold the tray in the open position by abutting against wall 42, FIG. 5.

The panel members 22, 24, 26 and 28 are fourteen gauge steel. The bottom left panel 29 and left panel 24 are formed of a pair of steel plates 50. The passenger's side of the partition is covered with a foam rubber padding 51 covered with a vinyl 52, FIG. 3.

The right, left, top and bottom panels form a frame for the window 18 which is held within a channel 60. The channel 60 has a bottom guide 62 and a side guide 63 for positioning a fixed bullet proof window 68 within a rubber molding 69. The channel 60 also has a bottom guide 64 and a side guide 65 for a sliding window 70. The window 70 slides on a pair of rods 71, FIG. 4.

In the model constructed in accordance with the principles of this invention, the sliding window 70 is 19 inches in width, the stationary window 33 inches in width and disposed to allow an inch overlap when the sliding window is in a completely closed position. The sliding window 70 closes and locks in position and is capable of being locked in selected positions by means of a catch lock 73 which cooperates with a rack (not shown).

The right panel 22, the left panel 24 and the top panel 26 are detachable from the channel 60 and may be replaced by panels adapted to fit other vehicles. The reason for this is that the bullet proof glass 18 is 1 3/16 inches thick and costs approximately $25.00 per foot. It is a selling advantage to have the bullet proof glass of the partition 10 usable on other vehicles to be driven successively by the driver.

Within the scope of the invention is the provision of bullet proof skirts to close the openings between the front seat and the passenger seat. Also, envisioned is the provision of a perforated sheet on the right hand side of the vehicle to allow voice and climate conditioning communication between the compartments of the vehicle. The exchange tray may take various configurations including square, rectangular and circular. Additional modifications within the scope of this invention include the provision of a loud speaker and microphone combination for voice communication between the compartments of the vehicle.

Summarizing, this bullet proof partition provides protection for a vehicle driver which is designed to prevent use of weapons requiring physical contact such as a knife or blackjack. The partition also provides bullet protection against hand held firearms up to .45 caliber. The use of fourteen gauge steel in double thicknesses provides quarter inch steel protection which is sufficient to stop a .45 caliber bullet. The glass plate $1\frac{3}{16}$ inches thick is also sufficient to stop a .45 caliber bullet. It is obvious that heavier gauges of steel or laminates and glass of increased thickness may be used for increased protection.

Added protection is provided the driver by placing a bullet proof sheet 20 in the back of the rear seat. The front seat 12 is adjustable with respect to the partition 10.

Although minor modifications might be suggested by those versed in the art, it should be understood that I wish to embody within the scope of the patent warranted hereon all such embodiments as reasonably and properly come within the scope of my contribution to the art.

I claim:

1. In a bullet proof partition for separating the driver and passenger compartments which are otherwise generally divided by a front seat of a vehicle such as a taxicab:
    frame means supporting a bullet proof window;
    said frame means having a money transfer aperture therein for exchanges between the driver and a passenger;
    a horizontally movable tray hingedly mounted on said frame at one side of said opening and swingable between a position in the driver compartment and a position within the passenger compartment and having means thereon for closing said opening when in either of said compartments; and
    releasable locking means operative to hold the tray in one of said positions.

2. A partition according to claim 1, said locking means being operative to lock said tray in the driver compartment position.

3. A partition according to claim 1, said locking means being operative to lock said tray in the passenger compartment position.

4. A partition according to claim 1, said locking means being operative to lock the tray in both of said positions selectively.

5. A partition according to claim 1, said locking means comprising a sliding bolt mounted on the frame at the opposite side of said aperture from the hinged mounting of said tray.

6. A partition according to claim 1, comprising biasing means connected between said frame and said tray and acting normally to return said tray to the driver compartment.

7. A partition according to claim 1, including means on said frame nestably engaging with the upper portion of the backrest of the front seat, and means for engaging the top and sides of the vehicle.

8. A partition according to claim 7, including removble opposite side and top panel means on said partition for adjusting the partition to different dimensions of vehicle bodies in which the partition may be mounted.

References Cited

UNITED STATES PATENTS

| | | | |
|---|---|---|---|
| 3,397,005 | 8/1968 | May | 296—24 |
| 2,997,331 | 8/1961 | Kudner | 296—24 |
| 2,007,595 | 7/1935 | Brykczynski | 296—24 |
| 1,958,321 | 5/1934 | Stadtler | 109—19 |
| 1,346,823 | 7/1920 | Hecht | 109—19 |

FOREIGN PATENTS

| | | |
|---|---|---|
| 1,145,272 | 5/1957 | France. |

PHILIP GOODMAN, Primary Examiner

U.S. Cl. X.R.

109—19